Figure 1:
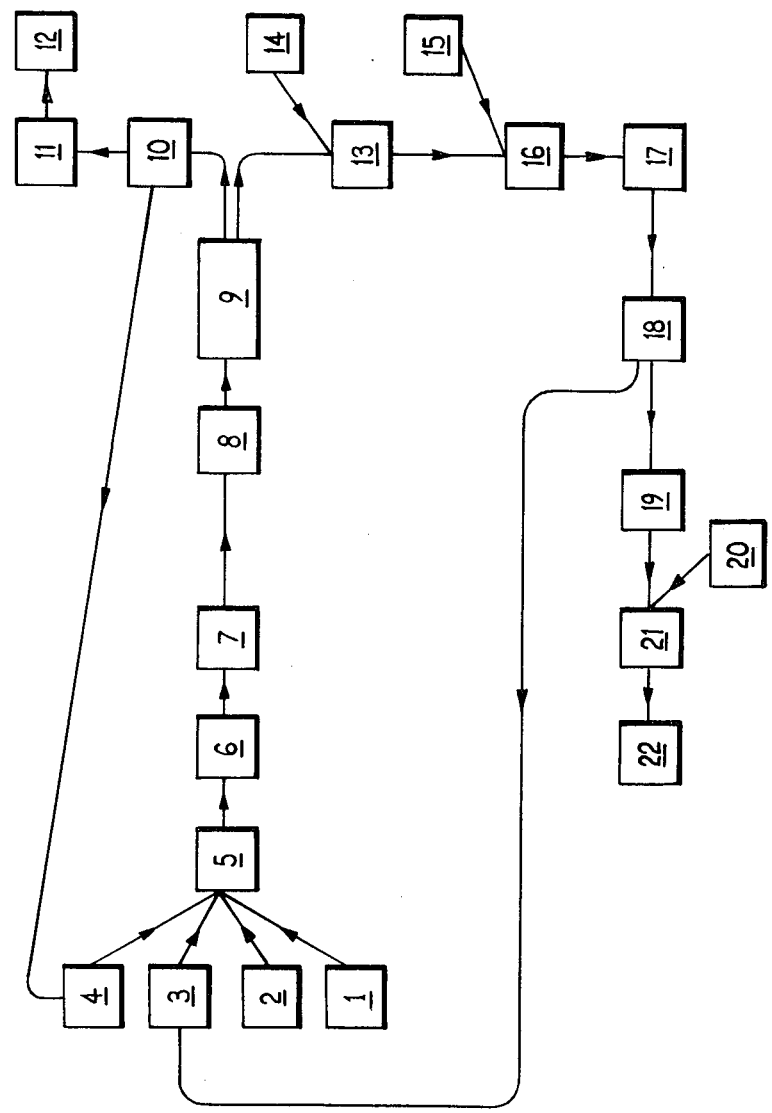

United States Patent [19]

Nielsen et al.

[11] Patent Number: 4,472,202
[45] Date of Patent: Sep. 18, 1984

[54] PROCESS FOR PRODUCING HYDRAULIC CEMENT FROM DICALCIUM SILICATE

[75] Inventors: Hans Christian A. Nielsen, Copenhagen, Denmark; Roberto Schroeder, Mexico, Mexico

[73] Assignee: Industrias Penoles S.A. de C.V., MXX

[21] Appl. No.: 392,388

[22] Filed: Jun. 28, 1982

[30] Foreign Application Priority Data

Jul. 6, 1981 [GB] United Kingdom ................ 8120849

[51] Int. Cl.³ .............................................. C04B 7/24
[52] U.S. Cl. .................................................. 106/103
[58] Field of Search ............................... 106/100, 103

[56] References Cited

U.S. PATENT DOCUMENTS 4,062,691 12/1977 Brachthauser et al. ............ 106/100

Primary Examiner—James Poer
Attorney, Agent, or Firm—Brumbaugh, Graves, Donohue & Raymond

[57] ABSTRACT

A process for producing hydraulic cement from dicalcium silicate, wherein the dicalcium silicate is mixed and ground with calcareous correction materials to produce a cement raw mixture which is preheated by suspending the raw mixture in a hot gas, and subsequently sintering the preheated material to cement clinker.

4 Claims, 2 Drawing Figures

PROCESS FOR PRODUCING HYDRAULIC CEMENT FROM DICALCIUM SILICATE

The present invention concerns a process (hereinafter referred to as of the kind described) for producing hydraulic cement from dicalcium silicate, the process comprising the steps of preparing a finely ground dry cement raw mixture by mixing and grinding dicalcium silicate with calcareous or calcareous and aluminous correction materials; and sintering the cement raw mixture to cement clinker in a burning step.

Aluminium is produced by electrolytic reduction of alumina, $Al_2O_3$. Any impurities contained in the alumina, except the alkali and alkaline earth metals, are also reduced to the metallic state. Accordingly the alumina fed to the reduction cells must be very pure. Iron and silicon are particularly undesirable impurities. The $Fe_2O_3$ content should not exceed 0.02 percent and the $SiO_2$ content should not exeed 0.05 percent. For the production of some grades of metal the $SiO_2$ content should not exceed 0.03 percent. Other undesirable impurities in alumina are titanium and phospherus.

At present, nearly all aluminium metal is produced from alumina extracted from bauxite ores by the Bayer process. Bauxite, which consists essentially of hydrated aluminium oxide with smaller amounts of impurities such as iron and titanium oxides, is digested with a hot solution of sodium hydroxide in water to extract the alumina as a solution of sodium aluminate. The iron oxides and other impurities remain in the residue, and the alumina is precipitated as alumina trihydrate $Al(OH)_3$. Precipitation is effected by cooling or diluting the sodium aluminate solution and adding fine crystals of aluminum hydroxide from a previous batch to act as seed crystals.

For many years research has been carried out to develop methods of manufacturing alumina economically from non-bauxite sources, i.e. aluminous siliceous materials, comprising complex aluminium silicates.

Two interesting processes are based on the reactions occuring during sintering the aluminous siliceous material, with calcareous material such as limestone to clinker whereby the silicates are converted to dicalcium silicate ($C_2S$) which is insoluble in water, and the aluminium is converted into water soluble aluminates. Alumina is subsequently recovered by leaching the cooled and disintegrated clinker with a caustic alkali solution, precipitating the minor amounts of silica present in the leaching solution in a desilication step, and precipitating alumina from the desilicated leaching solution.

Two variants have been known for the last hundred years:

(1) The lime method where a finely ground mixture of aluminous siliceous materials with a low content of alkali metals and limestone are sintered to clinker essentially consisting of dicalcium silicate and calcium aluminate.

(2) The lime soda method where a finely ground mixture of aluminous siliceous materials, preferably with a high content of alkali metals, limestone and optionally alkali metal compounds, such as soda, is sintered to clinker essentially consisting of dicalcium silicate and alkali metal aluminate.

Alumina is subsequently recovered by leaching the cooled and disintegrated clinker with a caustic alkali solution, precipitating minor amounts of silica present in the leaching solution in a disilication step, and precipitating alumina from the disilicated leaching solution.

Different variants of the lime soda process are described in U.S. Pat. Nos. 1,971,354 and 2,141,132.

The sintering is carried out at at least 1200° C., and the process is thus far more energy consuming than the Bayer process, but a considerable improvement in the economy of the process can be achieved by combining the alumina recovery with cement production, utilizing the dicalcium silicate by-product obtained as a residue in the leaching step as a component in the raw material for the cement production.

This residue is too high in silica and too low in calcium to make a good portland cement which must contain a certain amount of tricalcium silicate ($C_3S$) and optionally tricalcium aluminate ($C_3A$). If it is not desired to produce a cement with a low aluminate content the residue is also too poor in alumina.

In order to produce a proper cement raw mixture calcareous correction materials must be added to the residue, and if the cement should not be of the low aluminate type further correction materials must also be added.

It is known to produce cement from the above mentioned raw materials by a method analogous with the wet method known from ordinary cement technology, for example as disclosed in U.S. Pat. No. 2,421,918 (Anderson).

However, it is also known that this special type of cement burning is more difficult to control than the one in which use is made of common raw materials. More particularly, $C_2S$ is known as a material which is difficult to burn as it is seen in that $C_3S$ is not formed to the extent desired. To this is added that the dicalcium silicate by-product will be contaminated with alkali metal compounds, and that alkali metal-containing raw materials are known to give rise to problems by the dry cement burning process according to which a dry mixture of the raw materials is introduced into a rotary kiln and burnt to clinker.

The object of the invention consists in providing a process of the kind described which avoids the above mentioned disadvantages, so that cement clinker of good quality is obtained.

It has surprisingly been found that this can be achieved, in accordance with the invention, by a process of the kind described which is characterized in that the burning step comprises preheating the finely ground dry cement raw mixture to 700°–1050° C. by suspending the raw mixture in a hot gas in a preheating zone, precipitating the preheated mixture from the hot gas and sintering the precipitated material to cement clinker in a clinker burning zone.

As dicalcium silicate there could be used dicalcium silicate produced by any known method, e.g. as a by-product by the lime or the lime soda method, in particular by a variant of the lime soda method described below.

By calcareous correction materials are understood any material comprising or dissociating into CaO at or below the sintering temperature, such as oxide, hydroxide or preferably carbonate of calcium, such as limestone, sea shells, coral rock, chalk, marl and industrial waste products containing CaO or $CaCO_3$.

By aluminous correction materials are understood any material containing alumina, comprising aluminates and complex aluminates, such as clay. The residue of the lime soda method, containing the dicalcium silicate, and the correction materials are ground together or separately, and the mixture is homogenized before it is subjected to the burning step.

The preheating may be carried out in a cyclone preheater known per se for heating fine materials, and the sintering process may be carried out in a short rotary kiln.

It has surprisingly been found that preheating the cement raw mixture to 700°–1050° C., preferably 800°–925° C., and most preferably to 850°–900° C., by suspending it in a hot gas seemingly provides an improved reactivity of the raw materials, i.e. a more easy formation of $C_3S$. No tendency of formation of blockings in the preheating or clinker burning zones is observed.

The reason for the observed improved reactiviy may be as follows. $C_3S$ is formed by a reaction between CaO and $C_2S$ starting at a relatively high temperature well above the calcination temperature of $CaCO_3$, being about 875° C. When calcium carbonate is used as calcareous correction material a special reactive modification of CaO is formed by the calcination process. However, during the heating process where the CaO is heated to the reaction temperature for $C_3S$ formation a recrystallisation process occurs converting the reactive CaO to a less reactive crystal modification. Also $C_2S$ will show a tendency to recrystallisation at temperatures below the above mentioned reaction temperature converting the $C_2S$ to a less reactive form. However, when the materials are preheated according to the invention the time for preheating the materials is drastically reduced leaving no time for the time-consuming recrystallisation processes.

Preferably, the preheating comprises repeated suspension and precipitation of the cement raw mixture in countercurrent to the hot gas.

As hot gas, exit gas from the clinker burning zone may be used. However, hot air from a clinker cooler may be preferred if the exit gas from the clinker burning zone shows a high concentration of volatile alkali metal compounds.

A particular advantageous process is characterized in that the preheating comprises further heat transfer to the suspended raw mixture by introduction and combustion of fuel in the preheating zone.

Extremely stable sintering conditions are thus achieved, because a particularly stable kiln feed can be achieved and controlled by varying the fuel introduced in the preheating zone. Further, a particularly short treatment time is achieved, the retention time in the preheater being less than 30 seconds and the retention time in the clinker burning zone being about 10 to 15 minutes compared to the retention time of 2–5 hours in a long rotary kiln. No problems related to heavy dust formation, segregation of the raw mixture and blocking of the preheater were observed.

This development of the invention may be carried out in a multi stage cyclone preheater provided with a suspension burning furnace corresponding to a suspension calciner known from cement technology with a material outlet connected to a short rotary kiln.

When no fuel is introduced in the preheating, degrees of calcination of $CaCO_3$ are typically 20–30%. When fuel is burned in the preheating, a proper calcination zone is established and higher degrees of calcination are obtained, typically 75–95%, preferably 85–90%.

When the preheater comprises such a calcination zone, hot exit air from an air cooler for the cement clinker may be used as the air supply and the exit gas from the calcination zone may be used as the hot gas in the preheater, preferably mixed with exit gas from the clinker burning zone. The exit gas from the clinker burning zone may be introduced for the preheating via the calcination zone, e.g. together with the hot air from the clinker cooler. In order to reduce alkali recirculation in the preheater, 10–100% of the exit gas may bypass the preheating zone.

It is preferred if the dicalcium silicate is produced from aluminous siliceous starting materials by an improved version of the lime soda method involving the steps of mixing and grinding the aluminous siliceous starting material with correction materials to produce a preliminary finely ground dry raw mixture comprising oxides of aluminium, silicon, calcium and alkali metal having mole ratios $CaO/SiO_2$ and alkali metal oxide/$Al_2O_3$ substantially equal to two and on respectively; sintering the preliminary raw mixture to clinker containing alkali metal aluminate and dicalcium silicate in a preliminary burning step; cooling and disintegrating the clinker; and leaching the alkali metal aluminate from the disintegrated clinker by means of a caustic alkali leaching solution, thereby leaving a leaching residue containing the dicalcium silicate.

It is further advantageous if the preliminary burning step then comprises preheating the preliminary finely ground dry raw mixture to 700–1050° C. by suspending the preliminary raw mixture in a hot gas in a preliminary preheating zone, precipitating the preheated mixture from the hot gas and sintering the precipitated material to clinker in a preliminary clinker burning zone.

This development of the invention is described in more detail in, and forms the subject of our copending application of even date, Ser. No. 392,389, filed June 28, 1982.

As aluminous siliceous material there could be used any material that is cheap and readily available and contains at least 20% alumina, optionally occuring as complex aluminium silicates, such as naturally occuring ores like feldspars, leucite, nephelite, nepheline syenite, clay, shale, marl and siliceous bauxite, and industrial waste products such as blast furnace slag, residues from burning coal, e.g. fly ash, waste coal products, red mud from the Bayer process, white mud precipitated during the above mentioned desilication step, and others containing more or less silica. Preferred materials are materials with a relatively high alumina content, preferably such that have a content of alkali metal approximately equivalent to the alumina content, such as leucite, nephelite and nepheline syenote.

In order to obtain full conversion of the silicates to $C_2S$ and the alumina component to alkali metal aluminate correction materials must be added to the aluminous siliceous starting material. As this typically shows too low a content of CaO and alkali metal oxides, calcareous materials and alkali metal compounds are most often used as correction material.

By calcareous materials for preparing the preliminary raw mixture, there can be employed the above defined calcareous materials.

Alkali metal compounds include carbonate, oxides or hydroxides of alkali metals, in particular of sodium and potassium, such as soda, including industrial waste products, in particular alkali metal carbonate recovered from the leaching solution after precipitation of alumina and kiln dust from cement plants, in particular from the cement clinker burning zone.

In preparing the preliminary raw mixture, aluminous siliceous starting material, calcareous materials and alkali metal compounds are mixed in proportions depending on the analysis of these materials, but in such a way that the mole ratios $CaO/SiO_2$ and $Me_2O/Al_2O_3$ (Me means alkali metal) are approximately equal to 2 and 1 respectively.

The aluminous siliceous materials and the correction materials are ground together or separately and the mixture is homogenized before it is fed to the preliminary burning step.

It has surprisingly been found that preheating the preliminary raw mixture by suspending it in a hot gas provides an increased stability of the sintering in the preliminary clinker burning zone compared with the usual dry method described in U.S. Pat. No. 2,141,132 where the preheating takes place in the upper end of a long rotary kiln. The result is an easy leachable clinker product and improved operating conditions without the usual tendency of formation of rings and great lumps in the preheating and burning zones.

The preliminary preheating may be carried out in a, preferably multi stage, cyclone preheater known per se, and the preliminary burning may be carried out in a short rotary kiln.

According to a preferred example the preliminary preheating comprises repeated suspension and precipitation of the preliminary raw mixture in countercurrent to the hot gas, which is exit gas from the preliminary burning zone.

A particularly rapid and efficient preliminary preheating, to 700°–1050° C., preferably to 800°–925° C., and most preferably to 850°–900° C., is thus achieved and no problems related to heavy dust formation, segregation of the preliminary raw mixture and blocking of the preliminary preheater are observed.

A particular advantageous process is characterized in that the preliminary preheating comprises further heat transfer to the suspended preliminary raw mixture by introduction and combustion of fuel in the preliminary preheating zone.

Extremely stable working conditions are thus achieved, because a particularly stable feed to the preliminary clinker burning zone can be achieved and controlled by varying the amount of fuel introduced in the preliminary preheating zone. Further, the fuel supply to the preliminary clinker burning zone can be reduced significantly, eliminating the risk of overburning the clinker. Further, a particularly short treatment period is achieved, the retention time in the preliminary preheater being less than 30 seconds and the retention time in the preliminary clinker burning zone being about 10 to 15 minutes compared to the retention time of 2–5 hours in a long rotary kiln. No problems related to heavy dust formation, segregation of the first raw mixture and blocking of the preliminary preheater were observed.

This development of the invention may be carried out in a multi stage cyclone preheater provided with a suspension burning furnace corresponding to the suspension calciners known from the cement technology with a material outlet connected to a short rotary kiln.

When no fuel is introduced in the preliminary preheating zone, degrees of calcination of $CaCO_3$ are typically 20–30%. When fuel is burned in the preliminary preheating zone, a proper calcination zone is established in the preliminary preheating zone and higher degrees of calcination are obtained, typically 75–95%, preferably 85–90%.

When the preheater includes such a calcination zone, hot exit air from an air cooler for the clinker may be used as an air supply and the exit gas from the calcination zone may be used as hot gas in the preheating zone, preferentially mixed with the exit gas from the clinker burning zone. The exit gas from the clinker burning zone may be introduced into the preheating zone via the calcination zone, e.g. together with the hot air from the clinker cooler. In order to reduce alkali recirculation in the preheating zone, 10–100% of the above mentioned exit gas may by-pass the preheating zone.

The clinker produced in the preliminary burning step may be cooled in a cooler, e.g. in a grate cooler and crushed to a relatively coarse material which is easily leached with an aqueous alkaline solution.

An easily filtrable residue is thus obtained essentially consisting of $C_2S$. This residue is washed with water in order to remove remaining alkali the presence of which is undesirable in the cement clinker burning step according to the primary aspect of the invention.

Naturally, alumina may also be produced as an important product by precipitating alumina from the leaching solution, if necessary after the desilication step previously described.

Figure 2:
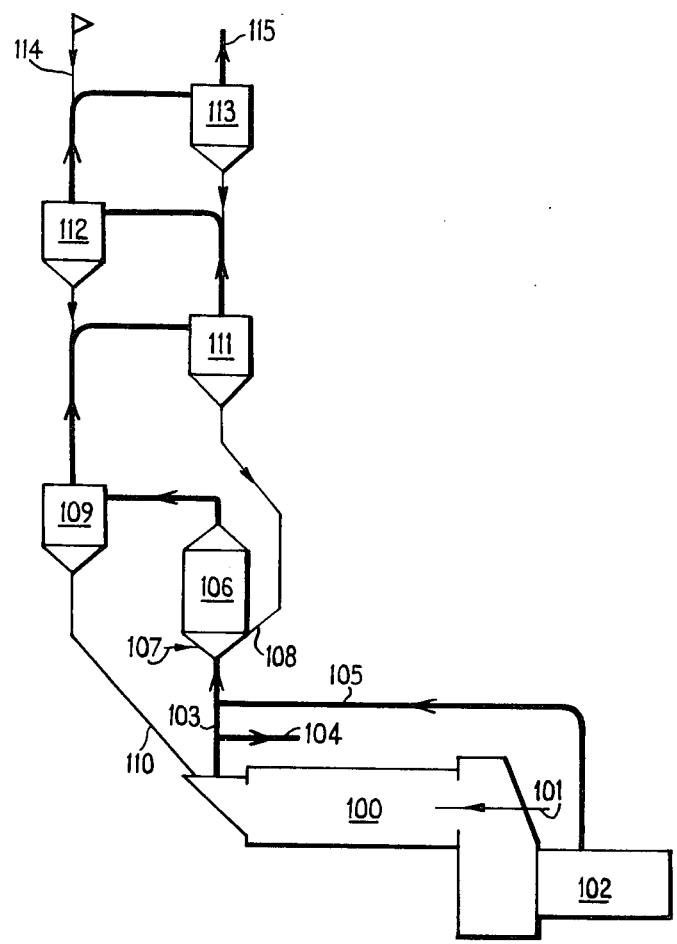

The invention will now be described, by way of example, with reference to the accompanying drawings, in which:

FIG. 1 shows a flow chart of a plant for combined production of alumina and cement including the process according to the invention; and, FIG. 2 shows an apparatus suited for carrying out the process according to the invention.

From storage bins 1, 2, 3, and 4 for nepheline syenite, limestone, alkali metal correction materials and white mud, respectively, streams of these materials are directed to a raw mill 5. The fine dry product from the raw mill 5 is directed to a homogenizing storage silo 6 from which the material is fed to an apparatus 7 where it is burned to clinker containing alkali metal aluminate and dicalcium silicate. The cooled clinker is crushed in a crusher 8 and leached with alkaline extraction liquid in a leaching apparatus 9. The alkali metal aluminate containing filtrate is desilicated in a silica precipitating apparatus 10. The precipitated white mud is directed to the white mud storage bin 4 and the filtrate is directed to a precipitation tank 11 in which alumina is precipitated. The alumina is dried to a high purity alumina end product which is deposited in an alumina storage bin 12.

The dicalcium silicate residue obtained in the leaching apparatus 9 is washed with water and mixed with red clay from a red clay storage bin 14, dried in a dryer 13, admixed with limestone from a limestone storage bin 15, and directed to a raw mill 16. The fine dry product from the raw mill 16 is directed to a homogenizing storage silo 17 from which it is fed to a cement burning plant 18 where the material is burned to cement clinker. Kiln gas dust from the cement burning is directed to the alkali metal correction material storage bin 3. The cooled clinker is stored in a clinker storage bin 19, mixed with a minor amount of gypsum from a storage bin 20 and milled to cement in a cement mill 21. The cement end product is stored in a cement storage bin 22.

FIG. 2 shows a preferred construction for the apparatus 7 and for the plant 18 and thus for carrying out the essential process according to the invention. A short rotary kiln 100 is provided with a fuel inlet 101, a clinker air cooler 102, a riser pipe 103 for exit gas provided with a by-pass duct 104, and a hot air inlet duct 105 connected to the clinker cooler 102. The mixture of kiln exit gas and hot air is introduced in a suspension calciner 106 provided with a fuel inlet 107 and an inlet 108 for preheated raw material which is calcined in suspended state and carried to a precipitation cyclone 109 with the exit gas from the suspension calciner. The precipitated material is directed to a material inlet 110 in the rotary kiln 100 and the hot gas from which the material is precipitated is directed to a multistage cyclone preheater, comprising three cyclones 111, 112 and 113, provided with a raw material inlet 114 and a gas outlet 115.

The method according to the invention was carried out on an industrial scale in a combined alumina/cement production plant having the flow sheet shown in FIG. 1. The burning steps took place in an apparatus as shown in FIG. 2. Test results from a typical run appear from the following example.

EXAMPLE

(1) Alumina Recovery.

240 units by weight of nepheline syenite and 460 units by weight of limestone having the analysis shown in Table I (in which all percentages are by weight); together with 20 units by weight of white mud containing about 15-25% $Al_2O_3$, 5-15% $SiO_2$, and 5-20% alkali metal oxides; and 10 units by weight of by pass dust containing about 40% alkali metal oxides from the second burning step were ground to a fineness corresponding to 25% greater than 0.08 mm.

The fine mixture was homogenized to a first raw mixture having mole ratios $CaO/SiO_2$ and $Me_2O/Al_2O_3$ (Me means alkali metal) equal to approximately 2 and 1, respectively, and fed to an apparatus as shown in FIG. 2 comprising a cyclone preheater fed with exit gas from a suspension furnace with a gas inlet connected to the exit gas outlet of a short rotary kiln and the exit air outlet of a grate clinker cooling the clinker produced in the short rotary kiln. Only 75% of the rotary kiln exit gas was directed to the suspension furnace the remaining 25% was removed and by-passed in order to reduce the alkali concentration of the hot gases in the kiln suspension furnace and cyclone preheater.

In less than 30 seconds the raw mixture was preheated to about 750° C. in the cyclone preheater and in less than 2 seconds it was heated to 850°-900° C. in the suspension furnace and directed to the rotary kiln where it was sintered to clinker at a sintering temperature of 1320° C. The retention time in the rotary kiln was only 10 to 15 minutes.

490 units by weight of clinker were obtained. The clinker was crushed to below 2 mm and leached with alkaline extraction liquid. A filtrate containing 80 units by weight of alkali metal aluminate of high purity (containing less than 3% $SiO_2$ and less than 0.1% $Fe_2O_3$ on dry weight basis) and a $C_2S$ residue was obtained.

The filtrate was first subjected to a desilification process in which the small amounts of silica present in the filtrate were removed from the filtrate and converted to the white mud mentioned above and then alumina was precipitated by reducing the pH-value of the filtrate. A high quality aliumina product was thus obtained with an $Al_2O_3$ recovery of 78%.

The $C_2S$ residue was washed with water and showed an $Al_2O_3$ content of less than 2.5% and an alkali metal oxide content of less than 2% indicating an efficient conversion of the complex aluminium silicates to alkali metal aluminate and $C_2S$.

(2) Cement Production 1000 units by weight of a dry cement raw mixture was prepared by drying 670 units by weight of the $C_2S$ residue and 70 units by weight of red clay and grinding these components with 550 units by weight of limestone to a fineness corresponding to 25% greater than 50 micron. Analysis of the red clay, limestone and cement raw mixture is shown in Table I.

The cement raw mixture was burnt to cement clinker in a second burning step in an apparatus of the design shown in FIG. 2.

Retention times were: in the cyclone preheater less than 30 seconds; in the suspension furnace less than 2 seconds; and in the short rotary kiln less than 20 minutes. Kiln by pass was 60%.

Material was introduced into the suspension furnace at about 750° C.; the temperature in the suspension furnace was 850°-900° C.; and the sintering temperature was about 1450° C.

790 units by weight of cement clinker were produced. The kiln by pass dust amounted to 15 units by weight. Analysis of the cement clinker is shown in Table I.

The cement clinker was ground and mixed with 30 units by weight of gypsum in the usual way producing 720 units by weight of portland cement of high quality with low alkali and free lime content.

TABLE I

| Material | Nepheline Syenite % | Limestone % | Red Clay % | Cement Raw Mix % | Cement Clinker % |
|---|---|---|---|---|---|
| $Al_2O_3$ | 20.6 | 0.2 | 23.8 | 3.0 | 3.8 |
| $Na_2O$ | 8.9 | Total Oxides | 0.04 | Total Oxides | Total Oxides |
| $K_2O$ | 6.3 | less than 0.2 | 0.13 | less than 2.0 | less than 0.5 |
| CaO | 1.3 | 50.0 | 0.4 | 53.2 | 66.7 |
| $CO_2$ | 1.3 | 40.9 | 0.6 | 18.5 | — |
| $SiO_2$ | 51.3 | 1.0 | 20.3 | 18.6 | 23.3 |
| $Fe_2O_3$ | 3.3 | 0.2 | 6.5 | 1.7 | 2.0 |

We claim:

1. A process for the production of hydraulic cement comprising the steps of preparing a finely ground dry cement raw mixture by mixing and grinding dicalcium silicate with calcareous correction materials or calcareous correction materials and aluminous correction materials; and sintering said cement raw mixture to cement clinker in a burning step; characterized in that said burning step comprises preheating said finely ground dry cement raw mixture to 700°-1050° C. by suspending said raw mixture in a hot gas in a preheating zone, precipitating said preheated mixture from said hot gas thereby providing a precipitated material and sintering said precipitated material to said cement clinker in a clinker burning zone for a period of from 10 to 15 minutes.

2. A process according to claim 1, wherein said preheating comprises repeated suspension and precipitation of said cement raw mixture in countercurrent to said hot gas.

3. A process according to claim 1 or claim 2, wherein said preheating comprises further heat transfer to said suspended cement raw mixture by introduction and combustion of fuel in said preheating zone.

4. A process according to claim 1, wherein said cement clinker is air cooled in a cooling zone, and said hot gas is exit air from said cooling zone.

* * * * *